United States Patent

Schut et al.

[15] 3,689,490

[45] Sept. 5, 1972

[54] DERIVATIVES OF 2-(4-ARYL-1-PIPERAZYL)-BICYCLO[3.3.1]NONAN-9-ONES

[72] Inventors: Robert Norman Schut, Edwardsburg, Mich.; Frederick Edmund Ward, Elkhart, Ind.

[73] Assignee: Miles Laboratories, Inc., Elkhart, Ind.

[22] Filed: May 19, 1969

[21] Appl. No.: 825,935

[52] U.S. Cl. .......260/268 BC, 260/268 PH, 424/250
[51] Int. Cl. .............................................C07d 51/70
[58] Field of Search ...424/250; 260/268 BC, 268 PH

[56] References Cited
UNITED STATES PATENTS 3,108,998   10/1963   Poos.....................260/268 BC
3,354,161   11/1967   Schut....................260/268 PH

*Primary Examiner*—Donald G. Daus
*Attorney*—Joseph C. Schwalbach, Michael A. Kondzella, Louis E. Davidson and Harry T. Stephenson

[57] ABSTRACT

Compounds which are derivatives of 2-(4-aryl-1-piperazyl)-bicyclo[3.3.1]nonan-9-ones are prepared that demonstrate useful tranquilizing activity. These compounds are prepared by reacting 2-(4-aryl-1-piperazyl)bicyclo[3.3.1f]nonan-9-ones with a suitable compound in a carbonyl addition reaction.

5 Claims, No Drawings

DERIVATIVES OF 2-(4-ARYL-1-PIPERAZYL)-BICYCLO[3.3.1]NONAN-9-ONES

This invention relates to a novel series of chemical compounds having beneficial pharmacological properties. More particularly, the invention relates to derivatives of 2-(4-aryl-1-piperazyl)bicyclo[3.3.1]nonan-9-ones which possess advantageous pharmacological characteristics. Compounds of this invention may be represented by the general structural formula

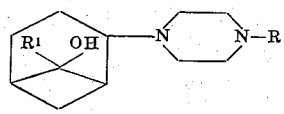

in which R is aryl or substituted aryl and $R^1$ is aryl, substituted aryl or alkyl. Preferably, in the compounds of this invention, aryl is phenyl or substituted phenyl and alkyl is a lower alkyl of between one and six carbon atoms.

PREPARATION OF COMPOUNDS

Compounds of this invention are conveniently prepared by a carbonyl addition reaction. Preparation of these compounds may be represented by the following equation:

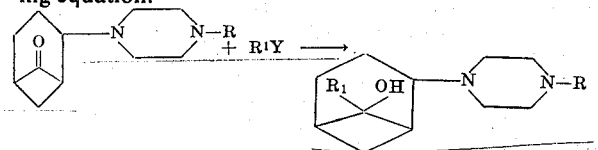

In this equation Y is a monovalent metal or a magnesium halide. Although the reaction conditions are not considered critical, the reactants are beneficially combined in a solvent which is inert under the reaction conditions and maintained between about room temperature and reflux.

The novel compounds of this invention may be isolated as free bases and are preferably furnished as acid addition salts. Beneficially, pharmacologically acceptable salts suitable for incorporation with medications are formed. Satisfactory non-toxic, water-soluble, acid addition salts may be formed from inorganic acids such as the mineral acids, for example halogen acids or sulfuric acid, or from organic acids such as critic acid, maleic acid, tartaric acid, and other similar acids. The preparation of these addition salts is described in the subsequent detailed examples and will not, therefore, be set forth at this point.

UTILITY

The compounds of this invention have demonstrated beneficial pharmacological properties. Surprisingly, these compounds have demonstrated activity as tranquilizing agents. Additionally, these compounds have exhibited an unexpectedly prolonged period of activity after administration.

MEDICATION

Medications may be conveniently prepared including at least one of the novel compounds of this invention as an active ingredient in the form of the free base or pharmacologically acceptable acid addition salt thereof. These medications may be beneficially prepared by combining the active ingredient with a pharmaceutical vehicle including components selected from the fillers, carriers, extenders, excipients, and the like generally used in pharmaceutical formulations. Medications may be prepared in the solid state as tablets, capsules or suppositories, or in the liquid state as solutions or suspensions. Dosage forms suitable for oral, rectal, parenteral, or other convenient means of administration may be provided. The pharmaceutical vehicle may also include common diluents or tableting adjuncts such as cellulose powder, cornstarch, lactose, talc and such, used according to accepted pharmaceutical manufacturing practices. Unit dosages (a specific weight, such as mg. or g.) of active ingredient in the medication may be varied so that an adequate amount is present to provide a desired therapeutic dose without untoward side effects, as well as to permit satisfactory variation in doses administered. A dose is considered as a ratio of the weight of active ingredient administered to a patient's body weight, usually expressed as mg./kg.

The amount of active ingredient administered to a warm blooded patient is advantageously between about 0.01 and 0.5 gram per day. This amount may be varied according to the desired therapeutic dose.

Since the unit dose administered at a given time and the dose desired will vary according to the animal being treated, it is desirable to incorporate the active ingredient into medications in a form which is readily administered and in a quantity that permits flexibility in the unit dose given at a particular time. Beneficially the medication will contain between about 1 and 75 percent active ingredient and preferably between about 1 and 50 percent. With the higher percentage of active ingredient, the tablet, pill, etc., are of such a small size they become difficult to handle. This amount of active ingredient may be incorporated in any convenient size of tablet, capsule, pill, etc. For example, a tablet weighing between about 200 and 800 mg. may be prepared. In another form, a capsule weighing between about 700 and 1,000 mg. may be used.

A unit dose may be prepared by combining the active ingredient in the above described quantities with a suitable pharmaceutical vehicle according to accepted pharmaceutical techniques.

This invention will be further understood by reference to the following examples which describe specific compounds, the process for the preparation thereof and the evaluation of the pharmacological activity of these compounds. These examples are representative of some compounds of this invention and are not intended to limit the scope of the invention which is defined in the appended claims.

EXAMPLE 1

A. 2-(4-Phenyl-1-piperazyl)-9-phenylbicyclo[3.3.1]nonan-9-ol

A solution of phenylmagnesium bromide in dry tetrahydrofuran (THF) was prepared by adding 23.6 g (0.15 mole) of bromobenzene to 3.7 g (0.15 g-atom) of magnesium and 200 ml THF. Then 15 g (0.05 mole) of 2-(4-phenyl-1-piperazyl)bicyclo[3.3.1]-nonan-9-one in 350 ml anhydrous ether and 150 ml of dry THF was added. The solution was stirred under reflux in a nitrogen atmosphere overnight. A solution of 10 g of $NH_4Cl$ in 200 ml $H_2O$ was added to the cooled solution. The THF and ether were distilled and the remaining mixture extracted into chloroform. The dried extract was concentrated in vacuo and the solid residue was suspended in pentane. The suspended product was collected by filtration; yield 17.3 g of light pink solid, m.p. 138°–140°C. Recrystallization from benzene-hexane gave 11.0 g of product, m.p. 142°–143°C; $\nu_{max}^{CHCl_3}$ 3,595 (free OH), 3,400 (bonded OH) cm$^{-1}$.

Anal. Calcd. for $C_{25}H_{32}N_2O$: N, 7.45.
Found: N, 7.47.

B. 2- (4-phenyl-1-piperazyl)-9-phenylbicyclo[3.3.1] nonan-9-ol hydrochloride

A 10.5-g sample of 2-(4-phenyl-1-piperazyl)-9-phenylbicyclo[3.3.1]nonan-9-ol was dissolved in 250 ml of ether and 125 ml of ethyl acetate and treated with 7.7 ml of 3.2 N HCl in isopropyl alcohol. The product weighed 11.0 g; m.p. 203°–207°C (dec.). Recrystallization from aqueous methanol gave an analytically pure salt; yield 3.2 g; m.p. 248.5°–249°C (dec.).

Anal. Calcd. for $C_{25}H_{32}N_2O \cdot HCl$: Cl, 8.60; N. 6.78.
Found: Cl, 8.67; N, 6.75.

A second crop isolated from the filtrate by concentration amounted to 5.3 g, m.p. ca. 200°C. It was believed this crop comprised a geometrical isomer of the higher melting product.

EXAMPLE 2

2-(4-Phenyl-1-piperazyl)-9-methylbicyclo[3.3.1]nonan-9-ol hydrochloride

To a solution of 2-(4-phenyl-1-piperazyl)bicyclo[3.3.1]-nonan-9-one (7.0 gm; 0.023 mole) in dry THF was added 5 equivalents of methyllithium in ether. The system was maintained under nitrogen with the exclusion of moisture. The solution was stirred 4 hours, poured on ice water and allowed to stand 1 hour. The product was isolated by extraction with chloroform and purified as the hydrochloride (m.p. 300°C from aqueous-ethanol) yield 3.3 gm. $\nu_{max}^{CHCl_3}$ 3,600 free OH; 3,300–3,500 bonded OH; and no absorption at 1,715 cm$^{-1}$ (absence of ketone).

Anal: Calculated for $C_{20}H_{30}N_2O \cdot HCl$: C, 68.45; H, 8.90; N, 7.98.
Found: C, 67.83; H, 8.93; N, 7.74.

EXAMPLE 3

2-[4-(4-Fluorophenyl)-1-piperazyl]-9-phenyl-bicyclo[3.3.1]nonan-9-ol hydrochloride To a stirred solution of phenylmagnesium bromide (18.1 g; 0.1 mole) in dry THF was added a solution of 2-[4-(4-fluoro-phenyl)-1-piperazyl]bicyclo[3.3.1]nonan-9-one (16.4 g; 0.051 mole) in dry THF. The mixture was refluxed for 3 hours. The complex was destroyed with an NH$_4$Cl (saturated) solution. Magnesium sulfate and charcoal were added and the mixture stirred for 15 minutes. The mixture was filtered and the filtrate concentrated to an oil in vacuo to yield 18.2g. $\nu_{max}^{CHCl_3}$ absorption; 3.600 cm$^{-1}$ (free OH); 3,200–3,500 cm$^{-1}$ (bonded OH), no (C=).

The base was converted to the hydrochloride in aqueous 2-propanol. Recrystallization from aqueous methanol gave 6.7 g. of product, m.p. 227°–228°C (dec.).

Anal. Calculated for $C_{25}H_{31}FN_2O \cdot HCl$: C,69.66; H, 7.48; N, 6.50.
Found: C, 68.60; H, 7.62; N, 6.43.

EXAMPLE 4

2-(4-Phenyl-1-piperazyl)-9-(4-fluorophenyl)bicyclo[3.3.1]nonan-9-ol

To a solution of p-fluorophenylmagnesium bromide (25.75 g; 0.13 mole) prepared from p-fluorobromobenzene (22.6 g; 0.13 mole) and Mg (3.1 g; 0.13 g at.) in dry THF (100 ml) was added 2-(4-phenyl-1-piperazyl)bicyclo[3.3.1]nonan-9-one (12.85 g; 0.043 mole) in dry THF (b 100 ml). The system was maintained under a nitrogen atmosphere with exclusion of moisture. The mixture was stirred for 12 hours. The complex was destroyed with saturated NH4Cl solution. The inorganic salts were collected by filtration and washed with boiling CHCl$_3$. The filtrate was concentrated to a pink oil in vacuo. The oil was taken up in boiling heptane and filtered through layers of activated charcoal and filter aid. A solid precipitate formed on cooling to yield 4.1 g. A second crop of 2.4 g was obtained by concentrating the filtrate to about 100 ml and cooling. The two crops were combined and recrystallized from methanol to yield 4 g of white crystalline solid, m.p. 182°–185°C. $\nu_{max}^{CHCl_3}$ 3,600 cm$^{-1}$ (OH) free; broad band centered at 3,390 cm$^{-1}$ (OH bonded); no absorption in C = O region (absence of ketone).

Anal. Calculated for $C_{25}H_{31}FN_2O$: C, 76.11; H, 7.92; N, 7.10.
Found: C, 75.97: H, 7.91; N, 7.34.

EXAMPLE 5

Spontaneous Motor Activity (SMA)

The effect of compounds of this invention on spontaneous motor activity was determined substantially according to the procedure of Kinnard, W. J. et. al. as set forth in J. Pharm. Exptl. Thereap., 121:354 (1957). Compounds of this invention were separately administered intraperitoneally in graduated doses as an active ingredient to separate groups of mice. A decrease in SMA was observed with compounds of this invention at a dose of 3.16 mg/kg and at higher doses.

EXAMPLE 6

Coordinated Motor Activity (CMA)

The effect of compounds of this invention on coordinated motor activity was assessed substantially according to the procedure of Dunham, N. W. et. al. as set forth J. Am. Pharm. Assn. (Scientific Edition), 46: 208 (1957). Compounds of this invention were separately administered intraperitoneally in graduated doses as an active ingredient to separate groups of mice. A loss of coordinated motor activity was observed with compounds of this invention is the test animals at a dose of 3.16 mg/kg and at higher doses.

EXAMPLE 7

Selectivity of action for compounds of this invention was evaluated according to the procedure of Kinnard, W. J. et al. as set forth in J. Pharm. Exptl. Therap. 121:354 (1957). A ratio of ED$_{50}$ CMA to ED$_{50}$ SMA was determined from values derived from tests carried out according to examples 5 and 6. For this comparison, the animals were rats and the active ingredient was administered intraperitoneally. The ratio of ED$_{50}$ CMA to $ED_{50}$ SMA for compounds of this invention was observed to be 2 to 5 times as high as the standards chlorpromazine, chlordiazepoxide, phenobarbital and meprobamate.

EXAMPLE 8

Conditioned Avoidance Response

Effect of compounds of this invention on conditioned avoidance response was established substantially according to the procedure of Warner, J. as set forth in J. Genet. Psychol. 14:57 (1930). Compounds of this invention were separately administered orally in graduated doses as an active ingredient to separate groups of rats. Compounds of this invention were compared against a standard, chlorpromazine, and were observed as effectively blocking the conditioned avoidance response at a dose corresponding to the standard compound.

What is claimed is:

1. A compound selected from the group consisting of compounds of the formula:

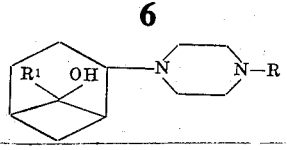

in which R is phenyl or substituted phenyl and $R^1$ is phenyl, substituted phenyl or a straight chain lower alkyl of between one and six carbon atoms, wherein the substituent on the phenyl is a halogen, and pharmacologically acceptable salts thereof.

2. A compound according to claim 1 which is 2-(4-phenyl -1-piperazyl)-9-phenylbicyclo[3.3.1]nonan-9-ol.

3. A compound according to claim 1 which is 2-(4-phenyl -1-piperazyl)-9-methylbicyclo[3.3.1]nonan-9-ol.

4. A compound according to claim 1 which is 2-[4-(4-flourophenyl)-1-piperazyl]-9phenylbicyclo[3.3.1]nonan-9ol.

5. A compound according to claim 1 which is 2-(4-phenyl-1-piperazyl)-9-(4-fluorophenyl)bicyclo[3.3.1]nonan-9-ol.

* * * * *

UNITED STATES PATENT OFFICE
CERTIFICATE OF CORRECTION

Patent No. 3,689,490           Dated September 5, 1972

Inventor(s) Robert Norman Schut & Frederick Edmund Ward

It is certified that error appears in the above-identified patent and that said Letters Patent are hereby corrected as shown below:

In Line 5 of the ABSTRACT, "--[3.3.1f]--" should read --[3.3.1]--. The structural formulas appearing at Column 1, Line 10-14 and Column 6, Lines 1-4 should read

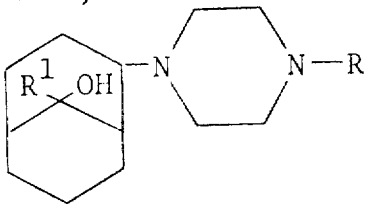

The equation appearing at Column 1, Line 27-31 should read

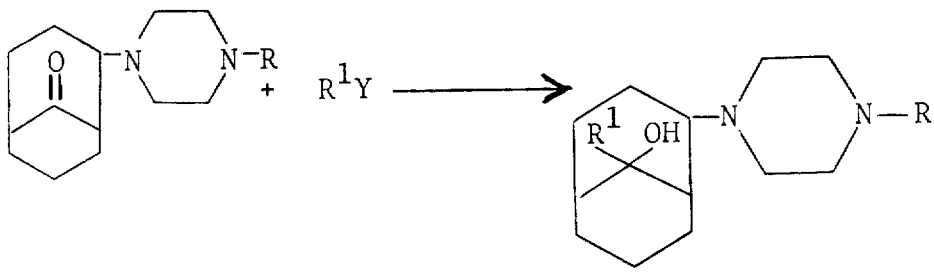

The name at Column 2, Line 62 should read --2-(4-phenyl-1-piperazyl)bicyclo[3.3.1]nonan-9-one--. In Column 3, Line 31 "--.3.1]-nonan-9-one--" should read --.3.1]nonan-9-one--; Line 59 "--3.600--" should read --3,600--. In Column 4, Line 10 "--(b 100 ml)--" should read --(100 ml)--; Line 13 "--NH4Cl--" should read --$NH_4Cl$--; Line 56 "--is--" should read --in--; Line 57 "--3.16--" should read --31.6--. In Column 5, Line 1 "--$ED_{30}$--" should read --$ED_{50}$--. In Column 6, Lines 17 and 18 should read --flourophenyl)-1-piperazyl]-9-phenylbicyclo[3.3.1]nonan-9-ol--.

Signed and sealed this 19th day of February 1974.

(SEAL)
Attest:

EDWARD M. FLETCHER, JR.
Attesting Officer

C. MARSHALL DANN
Commissioner of Patents